United States Patent
Hu

(10) Patent No.: US 9,763,077 B2
(45) Date of Patent: *Sep. 12, 2017

(54) METHOD AND SYSTEM FOR IMPLEMENTING DATA ROUTING OF ROAMING USER

(71) Applicant: HUAWEI TECHNOLOGIES CO., LTD., Shenzhen, Guangdong (CN)

(72) Inventor: Weihua Hu, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 33 days.

This patent is subject to a terminal disclaimer.

(21) Appl. No.: 14/542,803

(22) Filed: Nov. 17, 2014

(65) Prior Publication Data

US 2015/0071177 A1   Mar. 12, 2015

Related U.S. Application Data

(63) Continuation of application No. 12/613,828, filed on Nov. 6, 2009, now Pat. No. 8,891,443, which is a (Continued)

(30) Foreign Application Priority Data

Jan. 26, 2006   (CN) .......................... 2006 1 0033435

(51) Int. Cl.
*H04W 4/00* (2009.01)
*H04W 8/04* (2009.01)
(Continued)

(52) U.S. Cl.
CPC .......... *H04W 8/04* (2013.01); *H04L 61/1588* (2013.01); *H04L 61/2007* (2013.01);
(Continued)

(58) Field of Classification Search
CPC ............ H04W 8/12; H04W 8/04; H04L 69/24
(Continued)

(56) References Cited

U.S. PATENT DOCUMENTS 6,792,474 B1 * 9/2004 Hopprich .......... H04L 29/12283
370/392
6,961,563 B2 11/2005 Hoeller et al.
(Continued)

FOREIGN PATENT DOCUMENTS

CN    1343430 A    4/2002
CN    1452369 A    10/2003
(Continued)

OTHER PUBLICATIONS

3GPP TR 23.882 ( "3GPP System Architecture Evolution") ;3GPP;Dec. 2005;pp. 1-71.*
(Continued)

*Primary Examiner* — Ricky Ngo
*Assistant Examiner* — Dewanda Samuel
(74) *Attorney, Agent, or Firm* — Huawei Technologies Co., Ltd.

(57) ABSTRACT

A method and system for implementing data routing of a roaming user are disclosed. The method comprises: configuring a roaming protocol between the home network and the roaming network; during the registering process of the user in the roaming network, performing an interactive negotiation between the home network and the roaming network, so as to determine one of the home network and the roaming network to allocate IP address according to the roaming protocol between the home network and the roaming network; and establishing the IP access bearer based on the IP address.

8 Claims, 4 Drawing Sheets

Related U.S. Application Data continuation of application No. 12/173,554, filed on Jul. 15, 2008, now abandoned, which is a continuation of application No. PCT/CN2007/000276, filed on Jan. 25, 2007.

(51) Int. Cl.

| | | |
|---|---|---|
| *H04W 8/12* | (2009.01) | |
| *H04L 29/06* | (2006.01) | |
| *H04L 29/12* | (2006.01) | |
| *H04W 80/04* | (2009.01) | |

(52) U.S. Cl.
CPC ............... *H04L 69/24* (2013.01); *H04W 8/12* (2013.01); *H04W 80/04* (2013.01)

(58) Field of Classification Search
USPC ........................................................ 370/328
See application file for complete search history.

(56) References Cited

U.S. PATENT DOCUMENTS

| | | | |
|---|---|---|---|
| 7,136,362 | B2 | 11/2006 | Chen |
| 7,184,418 | B1 | 2/2007 | Baba et al. |
| 7,343,158 | B2 | 3/2008 | Mizell et al. |
| 7,346,684 | B2 | 3/2008 | Borella |
| 7,366,509 | B2 | 4/2008 | Akgun et al. |
| 7,545,766 | B1 | 6/2009 | Muhanna et al. |
| 2002/0049059 | A1 | 4/2002 | Soininen et al. |
| 2002/0066036 | A1 | 5/2002 | Makineni et al. |
| 2002/0173307 | A1* | 11/2002 | Salmivalli ............... H04W 8/06 455/432.1 |
| 2003/0037176 | A1* | 2/2003 | Dannehr ................ G06Q 20/10 719/313 |
| 2003/0193921 | A1 | 10/2003 | Kim |
| 2004/0072578 | A1 | 4/2004 | Keutmann et al. |
| 2004/0148425 | A1* | 7/2004 | Haumont .......... H04L 29/06027 709/236 |
| 2004/0192283 | A1 | 9/2004 | Shaheen |
| 2004/0203775 | A1 | 10/2004 | Bourdeaut et al. |
| 2004/0228347 | A1* | 11/2004 | Hurtta ................. H04W 76/022 370/395.2 |
| 2005/0027866 | A1* | 2/2005 | Seurujarvi .......... H04M 3/2281 709/227 |
| 2005/0064889 | A1* | 3/2005 | Haumont ............. H04W 48/17 455/514 |
| 2005/0128956 | A1 | 6/2005 | Hsu et al. |
| 2005/0152401 | A1* | 7/2005 | Wiljakka ................ H04W 8/26 370/474 |
| 2006/0029014 | A1* | 2/2006 | Maturi .................. H04W 8/065 370/328 |
| 2006/0077926 | A1* | 4/2006 | Rune ....................... H04L 45/34 370/328 |
| 2007/0165630 | A1* | 7/2007 | Rasanen ............. H04L 12/5695 370/389 |
| 2008/0273488 | A1 | 11/2008 | Shaheen |

FOREIGN PATENT DOCUMENTS

| | | |
|---|---|---|
| CN | 1478232 A | 2/2004 |
| EP | 1139634 A2 | 10/2001 |
| EP | 1182832 A2 | 2/2002 |
| EP | 1334639 B1 | 10/2008 |
| JP | 2004180089 A | 6/2004 |
| WO | 0131472 A1 | 5/2001 |
| WO | 0239778 A1 | 5/2002 |
| WO | 0242861 A2 | 5/2002 |
| WO | 2004012433 A1 | 2/2004 |
| WO | 2004071055 A2 | 8/2004 |
| WO | 2004086718 A1 | 10/2004 |
| WO | 2005089438 A2 | 9/2005 |

OTHER PUBLICATIONS

3GPP TR 23.882 draft V0.9.0; 3rd Gerneration Partnership Project; Technical Specification Group Services and System Aspects; 3GPP System Architecture Evolution; Report on Technical Options and Conclusions(Release 7); Dec. 2005; total 75 pages.

Nokia; MME,UPE and Inter-AS Anchor in the evolved architecture; 3GPP TSG SA WG2 Architecture-S2#50; S2-060133; Agenda Item:7.4.6; Jan. 16-20, 2006; Budapest, Hungary; total 6 pages.

Huawei; Inter 3GPP Access System Mobility in Idle State; 3GPP TSG SA WG2 Architecture-52#50; S2-060208; Agenda Item: 7.4.1; Jan. 16-20, 2006; Budapest, Hungary; total 6 pages.

Huawei; Inter 3GPP Access System Mobility in Idle State; 3GPP TSG SA WG2 Architecture-S2#50; S2-060524 (Revision of 208,503); Agenda Item:7.4.1; Jan. 16-20, 2006; Budapest, Hungary; total 6 pages.

* cited by examiner

METHOD AND SYSTEM FOR IMPLEMENTING DATA ROUTING OF ROAMING USER

CROSS-REFERENCE TO RELATED APPLICATIONS

This application is a continuation of U.S. patent application Ser. No. 12/613,828, filed on Nov. 6, 2009, which is a continuation of U.S. patent application Ser. No. 12/173,554, filed on Jul. 15, 2008, which is a continuation of International Patent Application No. PCT/CN2007/000276, filed on Jan. 25, 2007, which claims priority to Chinese Patent Application No. 200610033435.1, filed on Jan. 26, 2006, all of which are hereby incorporated by reference in their entireties.

FIELD OF THE INVENTION

The invention relates to mobile communication, and more particularly, to a method and system for implementing data routing of a roaming mobile user.

BACKGROUND OF THE INVENTION

In order to ensure that an evolved mobile communication system may satisfy the continuously increasing requirements of users in a long term of future, the ability of possessing rapid increasing IP data service by the evolved mobile communication system should be enhanced, and the employment of packet technology in the mobile communication system should be further improved. Important aspects of this technology evolution include: reducing time-delay and latency time, increasing user data rate, increasing system capacity, enlarging coverage area, and decreasing overall cost of the operator. Backward compatibility of the evolved network architecture to the existing network is also an important consideration.

In a 3GPP system prior to the evolved network, an attaching process and a Packet Data Protocol (PDP) context activating process are two separated processes. Once powered on, a terminal firstly performs a General Packet Radio Service (GPRS) attaching process, which mainly includes a security process and a location updating process. When the attaching process is completed, the terminal does not simultaneously acquire an IP bearer. Only when the terminal further initiates the PDP context activating process, the terminal may be provided with an IP address and corresponding configuration parameters. This is to say, it is necessary for a user to perform the PDP context activating process before service communication, resulting in a relatively long time-delay for the user to turn from an idle state to a data communication state, a sequential process that is contrary to objectives of the evolved network.

It has been proposed to reduce the latency time for a mobile terminal to turn from the idle state into the data communication state by performing a network registration and a default IP bearer establishment are together in a System Architecture Evolution (SAE)/long-term evolution (LTE) system proposed, i.e., during the mobile terminal attaches to the network for the first time, the network allocates an IP address and some corresponding bearer resources to the mobile terminal. In this case, it is not specified whether or not the air-interface resource should be allocated. Thus, it is realized that the mobile terminal is always online, so as to provide service more quickly and rapidly by the network when the mobile terminal needs to perform data service. In short, it is at the time a user in the evolved network performs a network attaching process that a default IP bearer should be established. As illustrated in FIG. 1, the 3GPP Technology Report (TR) 23.882 made by 3GPP SA2 group provides a possible process of network attachment, as follows:

(1) Network Discovery and Access System Selection: a terminal of a mobile user discovers SAE/LTE access systems and then performs access system and network selection.

(2) Attaching Request: the terminal initiates an Attaching Request, which includes old registration information of the user (for example, temporary ID), to a Mobility Management Entity/User Plane Entity (MME/UPE). The Attaching Request includes a permanent ID of the user if the terminal does not report the old registration information of the user. The Attaching Request may include information for default IP bearer (for example, IP address or APN selected by the user).

(3) a. Sending old registration information: if the old registration information of the user is reported by the terminal, the MME/UPE derives the address of an old (i.e., "former") MME/UPE registered last time from the former registration information of the user, and sends the registration information of the user to the old MME/UPE so as to ask for the information of the user.

b. Sending user context information: the old MME/UPE sends the context information of the user to the new MME/UPE. The context information includes the permanent ID of the user, security context parameters, and so on.

(4) Security Functions (this step is optional): the new MME/UPE performs security authentication on the mobile user and equipment according to system configuration.

(5) MME Registration Updating: the new MME/UPE initiates a registration updating request toward a Home Subscriber Server (HSS), and registers as the MME/UPE currently serving the mobile user.

(6) Deleting user registration information: the HSS instructs the old MME/UPE to delete the context information of the mobile user.

(7) Registration Confirmation: the HSS confirms the registration of the new MME/UPE. The subscription information for the default IP bearer, the relevant Quality of Service (QoS) strategy and the charging control information are also sent to the serving (i.e., "new") MME/UPE.

(8) Selection of Intersystem Mobility Anchor: An Inter AS Anchor is selected, and the selection mechanism is not specified. The IP address configuration is determined based on user preference or subscribed data, or based on the strategy of Public Land Mobile Network (PLMN) or VPLMN.

(9) User Plane Routing Configuration: the Inter AS Anchor performs the IP layer configuration according to the determined IP address of the user. The User Plane is established and the basic strategies and charging rules are applied. It is not specified whether the establishment of the User Plane is initiated by the terminal or by the MME/UPE.

(10) IP Bearer QoS Configuration: the MME/UPE provides QoS Configuration of a default IP bearer (for example, the upper limit of data rate) to an evolved RAN. It is not specified whether a trigger mechanism is needed for this QoS Configuration (for example, it is needed when sending uplink or downlink data).

(11) Attachment Accept: the MME/UPE sends an attachment accept message indicating the acceptance of the terminal, and allocates a temporary ID for the terminal, the user's IP address is also sent to the terminal. In a roaming scene, roaming restrictions are checked, and the attachment is denied if the restrictions are violated.

(12) Attachment Confirmation: the terminal confirms the success of the attachment.

In the evolved network, the default IP bearer established during the user attaching process may bear IP-based protocol signaling, such as SIP protocol used by IP Multimedia Subsystem (IMS), as well as other potential services which may adopt default QoS controlling strategy and charging strategy. The QoSs required by upper layer application services are different largely from each other, and usually cannot be satisfied by the QoS provided by the default IP bearer. But the mobile user may continuously adopt the secondary PDP activating process which is similar to the existing process, based on the default IP bearer which has already been established, to accelerate the subsequent establishment processes for other service bearers and enhance the reaction speed of the system. Since the services established by the secondary activating process need to share the IP address used by the first activating process, the IP address allocation strategy for the default IP bearer acquired in the registering process of the mobile user is very important, in that the strategy directly decides the data plane routing of the services of default IP address.

In order to improve the service quality for a roaming user, the evolved network requires the ability for optimizing the user plane routing of the roaming user. For example, the data of the roaming user are transmitted to the destination directly through the roaming network, rather than being routed back to the home network. Practically, the optimization of the user plane routing need be controllable for the home network of the user, so as to guarantee the benefits of the home network operator. However, there are no definite strategy and method to realize this optimization at present.

SUMMARY OF THE INVENTION

Embodiments of the invention provide a method and system for implementing data routing of a roaming user, so as to control the IP address allocation for the default IP bearer of the roaming user and establish a user plane data routing of the roaming user which is controllable by the home network operator.

Embodiments of the invention provide a method for implementing data routing for a roaming user, including:

configuring a roaming protocol between a home network and a roaming network;

during a registering process of the user in the roaming network, performing an interactive negotiation between the home network and the roaming network, so as to determine one of the home network and the roaming network to allocate an IP address according to the roaming protocol between the home network and the roaming network;

establishing a default IP bearer with the IP address over the network.

Embodiments of the invention further provide a system for implementing data routing of a roaming user, including a roaming network element and a Home Subscriber Server (HSS), the HSS, on which a roaming protocol is stored, is adapted to determine an IP address allocation strategy according to the roaming protocol;

the roaming network element is adapted to select one of the home network and the roaming network to allocate an IP address according to the IP address allocation strategy determined by the HSS, and establish a default IP bearer.

In the solutions provided by the embodiments of the invention, the home network operator may comprehensively consider various relevant factors, such as the maturity of the roaming interconnection between the home network operator and the roaming network operator and so on, during the registering process of the mobile user in the roaming network, so as to control the allocation strategy of the default IP bearer address, i.e., so as to determine which one of the home network and the roaming network is to allocate the IP address for the default IP bearer. Embodiments of the invention implement the data plane routing optimization of the roaming user under the control of the home network operator, i.e., when the home network operator determines that the IP address for the default IP bearer may be allocated by the roaming network based on above mentioned factors, the IP address for the default IP bearer is allocated by the roaming network, so as to optimize the routing of the data plane for the roaming user to bear services by the default IP bearer.

Through the embodiments of the invention, while affording the benefit and dominant control right of the home network operator, the IP address of the default IP bearer for the roaming user may be allocated by the roaming network as much as possible, so as to optimize the routing of the data plane for the roaming user, improve the performance of the data service, and bring a better service experience to the roaming user.

DETAILED DESCRIPTION

In order to make principles, features and advantages of the invention more apparent, a further detailed description for the technical solutions of the invention is given below with respect to embodiments and with reference to the accompany drawings.

Embodiment One

Figure 1:
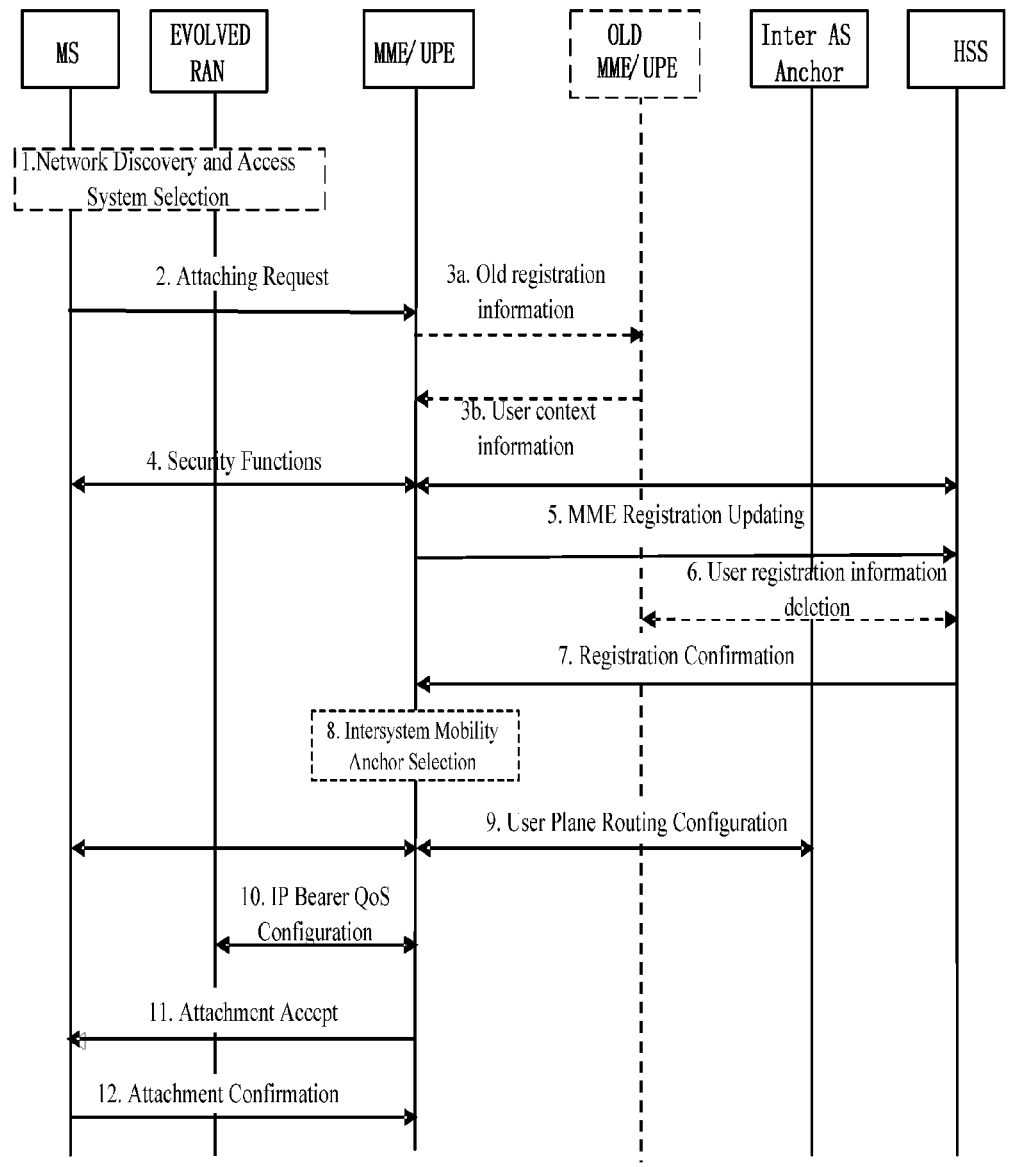
FIG. 1 shows a flowchart for network attaching in 3GPP TR 23.882.
Figure 2:
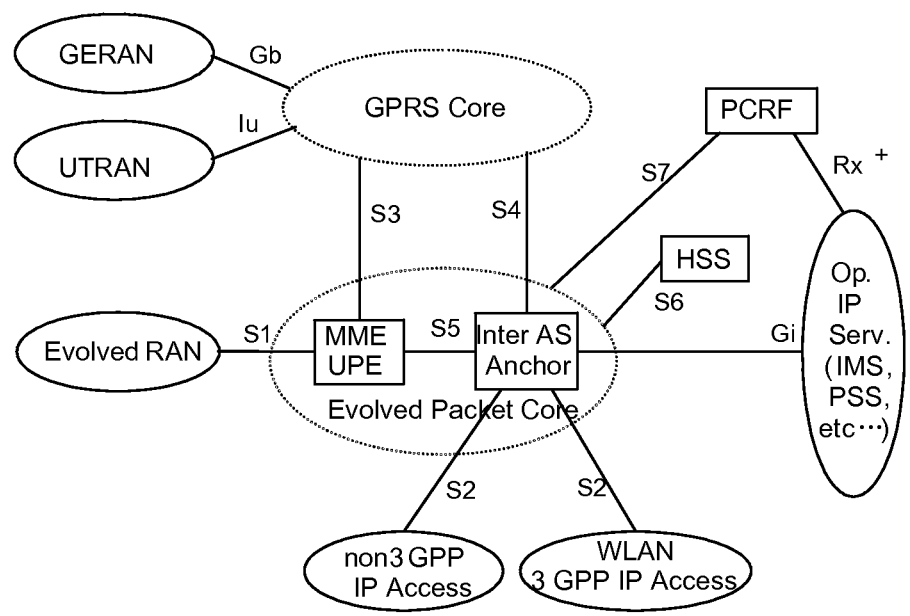
FIG. 2 shows a architecture diagram of a radio evolved network.

As shown in FIG. 2, a core network of a radio evolved network mainly includes three logic function entities: Mobility Management Entity (MME), User Plane Entity (UPE), and Inter AS Anchor (Inter AS Anchor is a user plane anchor for mobility between different access systems). The MME corresponds to a control plane part of a Serving GPRS Support Node (SGSN) inside a current Universal Mobile Telecommunication System (UMTS), and is responsible for the mobility management of the control plane, including the management of user context and mobility states as well as the allocation of user contemporary ID and security functions. The UPE corresponds to a data plane part of a GGSN and SGSN inside the current UMTS system, and is responsible for initiating a paging for downlink data under the idle state, managing and saving IP bearer parameters and intra network route information. The Inter AS Anchor acts as a user plane anchor for mobility between difference access systems. The functions of each interface in FIG. 2 and whether or not these interfaces exist are not finally specified. In FIG. 2, GERAN is GSM EDGE Radio Access Network; UTRAN is UMTS Terrestrial Radio Access Network; CN is Core Network; MS is Mobile Subscriber; UE is User Equipment; PCRF is Policy and Charging Rules Function.

Figure 3:
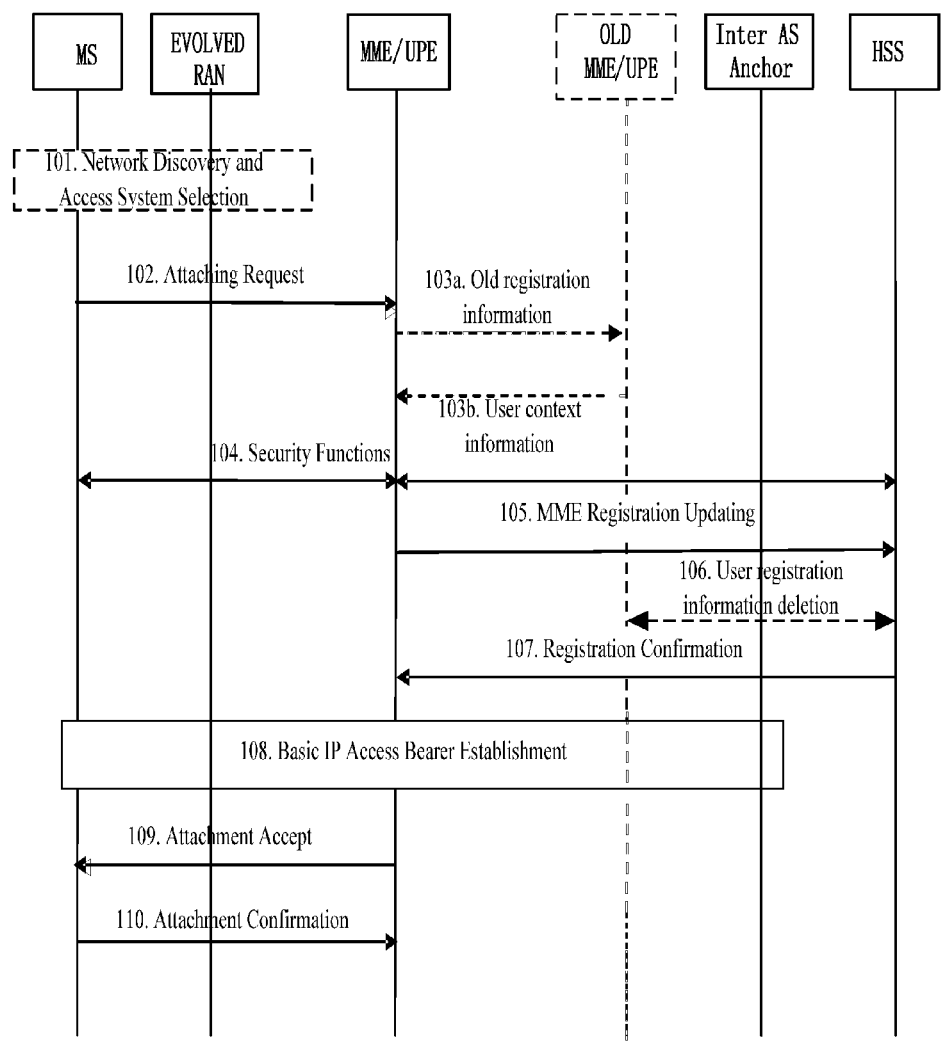
FIG. 3 shows a flowchart for network attaching of a roaming user according to an embodiment of the invention.

As shown in FIG. 3, based on interactive negotiation between a home network and a roaming network during the network registering process, the home network operator controls the allocation of IP address of the default IP bearer for the roaming user. If capabilities of an element terminal need to be taken into consideration during the interactive negotiation, the element terminal includes such information in an attaching request message, and the information about its capabilities is included in a registration updating request sent to the HSS by the MME/UPE of the roaming network. Based on the mobile subscriber ID and the visited PLMN where the user currently is located as well as taking the capabilities of the element phone into consideration, the HSS inquires the strategy configuration of the operator and determines whether or not the roaming network of the PLMN is allowed to allocate the IP address of the default IP bearer. The details are shown as follows:

A flow of network attaching process for optimizing data routing of a roaming user, including the following steps:

S101, Network Discovery and Access system selection: a terminal of a mobile user discovers SAE/LTE access systems and then selects an access system and network.

S102, Attaching Request: the terminal initiates an Attaching Request, which includes old registration information of the user (for example, temporary ID), to an MME/UPE. The Attaching Request includes a permanent ID of the user if the terminal does not report the old registration information of the user.

The Attaching Request may include information for default IP bearer (for example, IP address or APN selected by the user).

S103, a) Sending old registration information: if the old registration information of the user is reported by the terminal, the MME/UPE derives the address of an old (i.e., former) MME/UPE registered last time from the old registration information of the user, and sends the registration information of the user to the old MME/UPE so as to ask for the information of the user.

b) Sending user context information: the old MME/UPE sends the context information of the user to the new MME/UPE, and the context information includes the permanent ID of the user, security context parameters, and so on.

S104, Security Functions (this step is optional): the new MME/UPE performs security authentication on the mobile user and equipment according to the system configuration.

S105, MME Registration Updating (PLMN ID): the new MME/UPE initiates a registration updating request toward an HSS, and registers as the MME/UPE currently serving the mobile user. The registration updating request message includes the PLMN ID of the PLMN where the user is currently located.

S106, Deleting user registration information: the HSS instructs the old MME/UPE to delete the context information of the mobile user.

S107, Registration Confirmation (VPLMN Default IP Address Allowed): the operator to which the user belongs may in advance configure different roaming strategies for each user or certain class of users with respect to different PLMNs, and save the strategies in a database. For example, the strategies may allow the default IP address of a class A user to be allocated by VPLMN1, the default IP address of a class B user to be allocated by VPLMN2, and the default IP address of a class C user to be only allocated by the home network. Based on the mobile user ID and the visited PLMN where the user currently is located, the HSS inquires the above mentioned strategy configuration of the operator and determines whether or not the roaming network of the PLMN is allowed to provide the IP address allocation for the default IP bearer.

The HSS confirms the successful registration of the new MME/UPE. The subscribed data of the user are sent to the new MME/UPE. The subscription information related to the default IP bearer, the relevant QoS strategy, the charging rules information and so on are also sent to the new MME/UPE. The registration response message returned by the HSS includes an information element, i.e., VPLMN IP Address Allowed, for indicating whether or not the roaming network is allowed to allocate the IP address for the default IP bearer:

a. VPLMN IP Address Allowed=TRUE, the roaming network is allowed to allocate the IP address for the default IP bearer;

b. VPLMN IP Address Allowed=FALSE, the roaming network is not allowed to allocate the IP address for the default IP bearer, and the IP address needs to be allocated by the home network.

S108, Default IP bearer Establishment: According to the indication of the information element (VPLMN IP Address Allowed) included in the registration response message returned by the HSS, the MME/UPE selects one of the home network and the roaming network to allocate the IP address, then the network performs IP layer configuration for the default IP address, the User Plane is established and the basic QoS strategy and charging rules are applied. It is not discussed herein as to which network element allocates the IP address, the IP bearer establishing process may be similar to that as illustrated in FIG. 2.

S109, Attachment Accept: the MME/UPE informs the terminal that its attaching request is accepted, and allocates a contemporary ID for the terminal, the allocated user's IP address is also sent to the terminal. In a roaming scene, roaming restrictions are checked, and the attachment is denied if the restrictions are violated.

S110, Attachment Confirmation: the terminal confirms the success of the attachment.

Embodiment Two

Figure 4:
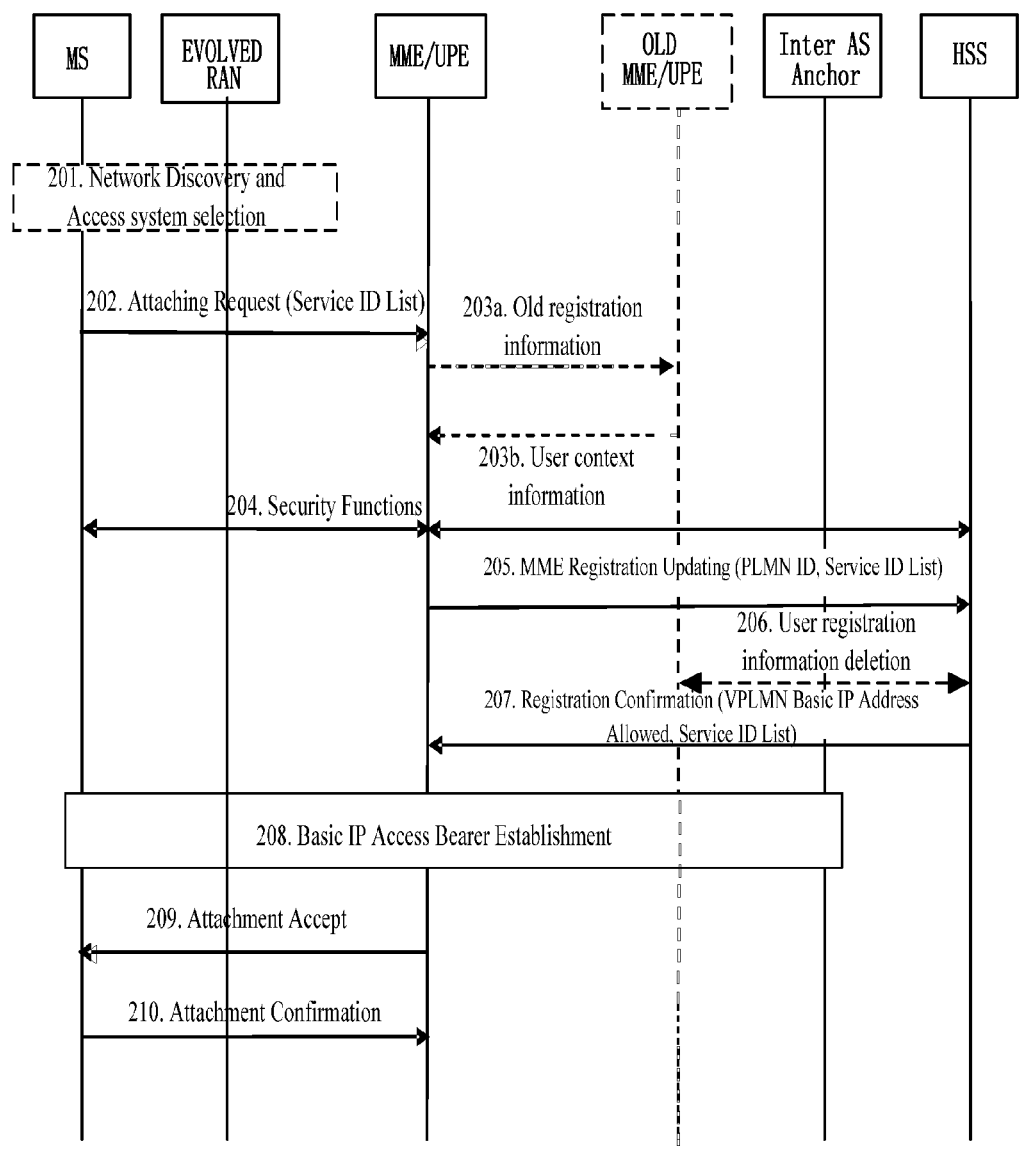
FIG. 4 shows a flowchart for network attaching of a roaming user according to another embodiment of the invention

If the service of default IP bearer in a future evolved network is not necessarily transparent to access network equipment (such as Evolved RAN (access network of future evolved network), MME/UPE, and Inter AS Anchor in FIG. 2), the above negotiation process may need to consider the supporting capability of the roaming network with respect to these non-transparent services. According to this respect, FIG. 4 shows another embodiment of the invention.

First, for the non-transparent services (such as IMS service, which is not transparent to the access network equipment when the IMS service needs support from the roaming network equipment) of default IP bearer, a series of service IDs or service types are defined, and a TLV (type-length-value) format may be adopted as follows:

| 8 | 7 | 6 | 5 | 4 | 3 | 2 | 1 |
|---|---|---|---|---|---|---|---|
| | Service ID List Type | | | Service ID List Length | | | |
| Re- | Re- | Re- | Ser- | Ser- | Ser- | Ser- | Ser- |

| | | | | | | | |
|---|---|---|---|---|---|---|---|
| served | served | served | vice 5 | vice 4 | vice 3 | vice 2 | vice 1 |
| ... | ... | ... | ... | ... | ... | ... | ... |

| 8 | 7 | 6 | 5 | 4 | 3 | 2 | 1 |
|---|---|---|---|---|---|---|---|
| Service Type List Type | | | | Service Type List Length | | | |
| Re-served | Re-served | Re-served | Service 5 | Service 4 | Service 3 | Service 2 | Service 1 |
| ... | ... | ... | ... | ... | ... | ... | ... |

The Service ID List Type or Service Type List Type is the identification of the whole information element for identifying the appearance of the information element.

The Service ID List Length or Service Type List Length is the length of the whole information element in unit of bytes.

Each service ID occupies one bit or employs a service ID value; or each service type occupies one bit or employs a service type value.

Referring to FIG. 4, a flow for network attaching and for optimizing data routing of a roaming user is specifically described as below:

S201, Network Discovery and Access system selection: a terminal of a mobile user discovers SAE/LTE access systems and then selects an access system and network.

S202, Attaching Request (Service ID List): the terminal initiates an Attaching Request, which includes old registration information of the user (for example, temporary ID), to an MME/UPE. The Attaching Request includes a permanent ID of the user if the terminal does not report the old registration information of the user.

The Attaching Request may include information for default IP bearer (for example, IP address or APN selected by the user).

The Attaching Request carries a service ID list or a service type list of non-transparent services of the default IP bearer for the mobile terminal. For example, if the terminal requires the default IP bearer to bear IMS service, the bit corresponding to IMS in the Service ID List information element of the Attaching Request message is set to 1, and all the other bits are set to 0; alternatively, the service ID value in the Service ID List information element or the bit corresponding to IMS in the Service Type List information element of the Attaching Request message is set to 1, and all the other bits are set to 0 or values corresponding to service types in the Service Type List information element.

S203, a) Sending old registration information: if the old registration information of the user is reported by the terminal, the MME/UPE derives the address of an old MME/UPE registered last time from the old registration information of the user, and sends the registration information of the user to the old MME/UPE so as to ask for the information of the user.

b) Sending user context information: the old MME/UPE sends the context information of the user to the new MME/UPE, and the context information includes the permanent ID of the user, security context parameters, and so on.

S204, Security Functions (this step is optional): the new MME/UPE performs security authentication on the mobile user and equipment.

S205, MME Registration Updating (PLMN ID, Service ID List/Service Type List): the new MME/UPE matches the Service ID List or Service Type List reported by the user with the capabilities of the system itself for supporting these services, so as to acquire an intersection set of the capabilities supported by the system and the requirements of the user. The new MME/UPE initiates a registration updating request toward the HSS, and registers as the MME/UPE currently serving the mobile user. The registration updating request includes the PLMN ID of the PLMN where the user is currently located and the updated Service ID List or Service Type List, which indicates the service list of the default IP bearer for the mobile user in the current roaming network; i.e., the intersection set service list allowed by the default IP bearer, which are both requested by the user and supported by the system.

For example, when the registration by an IMS is not transparent to network equipment (for example, a core network is required to inform the mobile user of the P-CSCF address), the user reports that the default IP bearer needs to bear the IMS. If the roaming network supports the IMS service, the bit corresponding to IMS in the Service ID List information element of the Register Updating Request sent from the MME/UPE to the HSS is set to 1 or the service ID value in the information element is set to 1. Alternatively, the bit corresponding to IMS in the Service Type List information element of the Register Updating Request is set to 1 or the service type value in the information element is set to 1. In contrast, when the roaming network can not support the IMS service, the bit corresponding to IMS is set to 0, or the service ID value is set to 0, or the service type value is set to 0.

S206, Deleting user registration information: the HSS instructs the old MME/UPE to delete the context information of mobile user.

S207, Registration Confirmation (VPLMN Default IP Address Allowed, Service ID List/Service Type List): the operator to which the user belongs may in advance configure different roaming strategies for each user or certain class of users with respect to different PLMNs, and save the strategies in a database. Based on the mobile user ID and the visited PLMN where the user currently is located, the HSS inquires the above mentioned strategy configuration of the operator to acquire the services which may be borne by the default IP bearer provided by the roaming PLMN network, and matches the services with the received service list of the default IP bearer in the current roaming network. According to the result of matching, the HSS determines whether or not the roaming network is allowed to provide the IP address allocation for the default IP bearer. If the default IP address is allocated by the roaming network, the HSS further determines the services which may be borne by the IP allocated by the roaming network.

The HSS confirms the successful registration of the new MME/UPE, and the subscribed data of the user are transmitted to the new MME/UPE. The subscription information of the default IP bearer, relevant QoS strategy and charging control information are also transmitted to the new MME/UPE.

According to the matching result in step S207:

a. If the roaming network is determined to allocate the IP address of the default IP bearer, the registration response message returned from the HSS should include an information element (VPLMN IP Address Allowed=TRUE) to indicate that the IP address of the default IP bearer is provided by the roaming network and an information element (Service ID List/Service Type List) to indicate the service list of the default IP bearer.

b. If the home network is determined to allocate the IP address of the default IP bearer, the registration response message returned from the HSS should include an information element (VPLMN IP Address Allowed=FALSE) to indicate that the roaming network is not allowed to allocate the IP address of the default IP bearer and the IP address needs to be allocated by the home network.

S208, Default IP bearer Establishment: According to the indication of the information element (VPLMN IP Address Allowed) included in the registration response message returned from the HSS, the MME/UPE selects one of the home network and the roaming network to allocate the IP address; then the network performs IP layer configuration for the default IP address, the User Plane is established and the basic QoS strategy and charging rules are applied. It is not discussed herein as to which network element allocates the IP address, the IP bearer establishing process may be similar to that as illustrated in FIG. 2.

S209, Attachment Accept (Service ID List): the MME/UPE informs the terminal that its attaching request is accepted, and allocates a contemporary ID for the terminal, the allocated user's IP address is also sent to the terminal.

In a roaming scene, roaming restrictions are checked, and the attachment is denied if the restrictions are violated.

If the IP address of the default IP bearer is allocated by the roaming network, the MME/UPE further informs the mobile user, via the Attachment Accept message, the service list allowed by the default IP bearer and the service list is returned from the HSS.

S210, Attachment Confirmation: the terminal confirms the success of the attachment.

Once the network registration is completed, based on the established default IP bearer, the mobile user may initiate IMS registration and other services that may be borne by the default IP bearer. If the mobile terminal receives the service list allowed by the default IP bearer returned by the network, the mobile terminal determines whether or not a service to be initiated subsequently belongs to the above mentioned service list. If the service does not belong to the service list, the mobile terminal initiate a process which is similar to the existing first PDP activating process, so as to establish a new default IP bearer for the service. The IP address of the established new default IP bearer is different from the IP address of the default IP bearer. Assuming that, in the embodiment, the HSS indicates that the IP address of the default IP bearer may be allocated by the roaming network and only IMS services may be borne by the default IP bearer. In this case, if the terminal initiates a IMS registration in a later time, the default IP bearer established during the network registering process may be used directly; if the terminal initiates a non-IMS service such as a VPN service in a later time, the terminal may initiate a process which is similar to the first PDP activating process of the existing 3GPP, so as to acquire a new IP address.

It should be understood that, although the MME and UPE are drawn together as a single unit in the schematic diagram, the MME and UPE may be separated in practice. In addition, the location of Inter AS Anchor in a network does not influence the adaptability of the invention. For example, the Inter AS Anchor and the UPE may be located in a same network node.

Through the embodiments of the invention, while affording the benefit and dominant control right of the home network operator, the IP address of the default IP bearer for the roaming user may be allocated by the roaming network as much as possible, so as to optimize the data plane routing of the roaming user, enhance the performance of data service, and bring better service experience for the roaming user.

The embodiments described herein are only to illustrate the invention, and are not intended to limit the scope of the invention. Any modification, equivalent substitution and improvement may be made to these embodiments without departing from the spirit and scope of the invention.

What is claimed is:

1. A method, comprising:
    sending, by a roaming network element, to a Home Subscriber Server (HSS) of a home network, a Public and Mobile Network identification (PLMN ID) of a roaming network where a user equipment (UE) is currently located;
    receiving, by the roaming network element, an IP address allocation strategy from the HSS according to the PLMN ID and an ID of the user, wherein the IP address allocation strategy comprises an information element indicating whether the roaming network is allowed to allocate an IP address to the UE;
    selecting, by the roaming network element, one of the home network and the roaming network to allocate an IP address according to the IP address allocation strategy; and
    establishing, by the roaming network element, an IP bearer.

2. The method according claim 1, wherein the method further comprises:
    receiving, by the roaming network element, an attach request from the UE.

3. The method according claim 1, wherein the method further comprises:
    determining, by the HSS, the IP address allocation strategy according to a roaming strategy corresponding to the PLMN ID and the identifier of the UE, wherein the roaming strategy indicates whether the roaming network is allowed to allocate the IP address to the UE.

4. The method according claim 1, wherein establishing an IP bearer comprises
    establishing an IP default bearer.

5. A roaming network element, comprising:
    a transmitter configured to send to a Home Subscriber Server (HSS) a Public Land Mobile Network identification (PLMN ID) of a roaming network where a user equipment (UE) is currently located;
    a receiver configured to receive an IP address allocation strategy determined by the HSS according to the PLMN ID and an ID of the UE, wherein the IP address allocation strategy comprises an information element that indicates whether the roaming network is authorized to allocate an IP address to the UE; and
    a processor configured to select one of a home network and the roaming network to allocate an IP address to the UE according to the IP address allocation strategy, and establish an IP bearer.

6. The roaming network element according claim 5, wherein
    the receiver is configured to receive an attach request from the UE.

7. The roaming network element according claim 5, wherein the roaming strategy indicates whether the roaming network is authorized to allocate the IP address to the UE.

8. The roaming network element according claim 5, wherein in establishing an IP bearer, the processor is further configured to establish an IP default bearer.

* * * * *